No. 672,025. Patented Apr. 16, 1901.
W. P. WALSH & C. F. ROHWER.
BEER COOLER.
(Application filed Feb. 8, 1901.)
(No Model.)
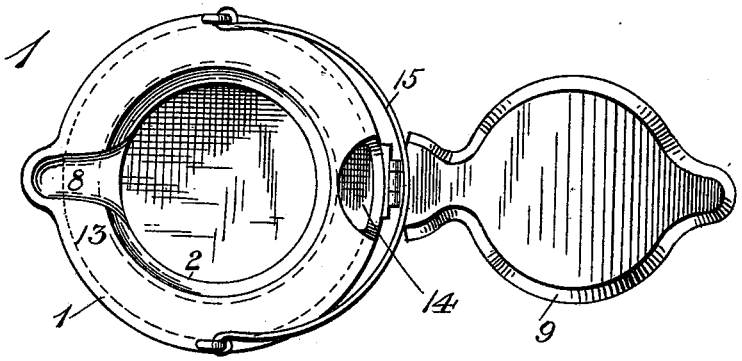
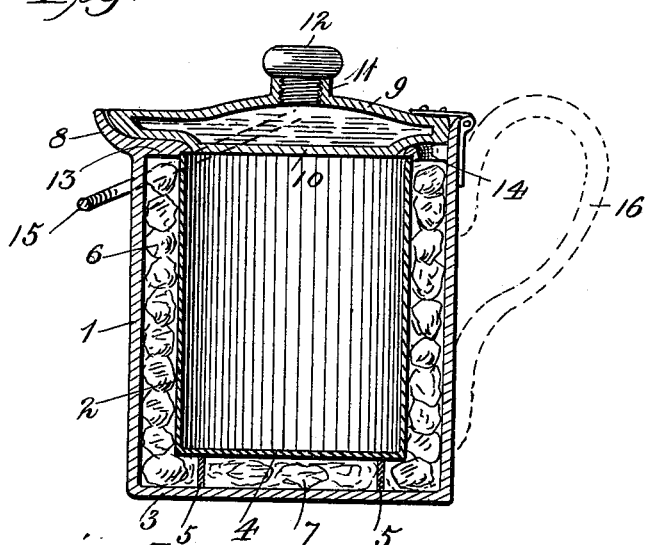
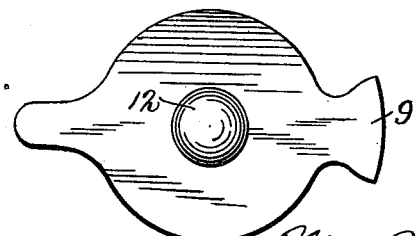
Witnesses
Franck L. Ourand
J. E. Lambert
Inventors
Wm P. Walsh
Carl F. Rohwer
By John S. Duffie
Attorney
THE NORRIS PETERS CO., PHOTO-LITHO., WASHINGTON, D. C.

UNITED STATES PATENT OFFICE.

WILLIAM P. WALSH AND CARL F. ROHWER, OF HOT SPRINGS, ARKANSAS

BEER-COOLER.

SPECIFICATION forming part of Letters Patent No. 672,025, dated April 16, 1901.

Application filed February 8, 1901. Serial No. 46,557. (No model.)

*To all whom it may concern:*

Be it known that we, WILLIAM P. WALSH and CARL F. ROHWER, citizens of the United States, residing at Hot Springs, in the county of Garland and State of Arkansas, have invented certain new and useful Improvements in Beer-Coolers; and we do hereby declare the following to be a full, clear, and exact description of the invention, such as will enable others skilled in the art to which it appertains to make and use the same.

Our invention is a beer-cooler; and it consists of a can or mug having an inner compartment, with a space between the inner and outer compartments, and of a lid having a receptacle for receiving ice, and a combination knob and stopper.

In the accompanying drawings, Figure 1 is a top plan view of our invention, the lid thrown open and the bail thrown back. Fig. 2 is a vertical sectional view of our invention, the bail thrown forward and a handle in dotted lines. Fig. 3 is a top view of the cover and combination knob and stopper.

Our invention is described as follows:

1 represents the outer can of the cooler.
2 represents the inner can.
3 represents the bottom of the outer can.
4 represents the bottom of the inner can.
5 represents the legs on which the inner can rests. These legs are securely fastened both to the inner and outer cans, and there is consequently left between the inner and outer cans a vertical space 6 all the way around and a horizontal space 7 under the bottom of the inner can for the reception of crushed ice. The cooler is also provided with a spout 8, which runs from the top of the inner can beyond the outer can, and fitting on the top of the cans and hinged to the outer can is a lid 9. This lid has a bottom or lower wall 10, leaving a space between the upper and lower walls of the lid, also for the reception of crushed ice. The upper wall of the lid is provided with a threaded neck 11, and in this threaded neck is fitted a headed screw 12, which answers the purpose of a stopper and a knob with which to raise the lid.

The vertical space between the outer and inner cans is closed by a cover 13 all the way around, except an opening 14, just under the rear part of the lid. This opening is to provide means for filling the spaces between the two cans with crushed ice, and it is put immediately under the rear part of the lid, so that when the cooler is tipped forward the ice or melted water will not spill out.

This cooler is primarily designed to hold a gallon or two of beer and is usually known in the trade as a "growler," and when made large it is provided with a bail 15, and it may be used as a mug, and in that case the bail will be dispensed with, and it will be provided with a handle, as shown by the dotted lines 16.

Having described our invention, what we claim as new, and desire to secure by Letters Patent, is—

1. A beer-cooler, consisting of an outer can 1; an inner can 2, not so deep as the outer can, and mounted on legs 5; a spout 8, extending from the top of the inner can, over the space between the two cans, and beyond the outer can; a cover 13, covering the vertical space between the two cans; an opening in the last-mentioned cover, immediately under the rear of the lid; a lid 9, hinged to the outer cover, and adapted to fit over the top of the inner can, and the spout, substantially as shown and described and for the purposes set forth.

2. A beer-cooler, consisting of an outer can 1; an inner can 2, not so deep as the outer can, and mounted on legs 5, a spout 8, extending from the top of the inner can, over the space between the two cans, and beyond the outer can; a cover 13, covering the vertical space between the two cans; an opening in the last-mentioned cover, immediately under the rear of the lid; a lid provided with an upper wall 9, and lower wall 10, and leaving between the two a space; a threaded neck 11, extending from the upper wall, and a headed and threaded knob, screwing into the threaded neck, substantially as shown and described and for the purposes set forth.

In testimony whereof we affix our signatures in presence of two witnesses.

WILLIAM P. WALSH.
CARL F. ROHWER.

Witnesses:
REDMOND JOYCE,
J. A. BAUER.